July 17, 1962  T. G. MALUF  3,044,698
ELAPSED TIME COMPUTER
Filed April 28, 1955  2 Sheets-Sheet 1

INVENTOR
TAUFIK GABRIEL MALUF

Strauch, Nolan & Diggins
ATTORNEY

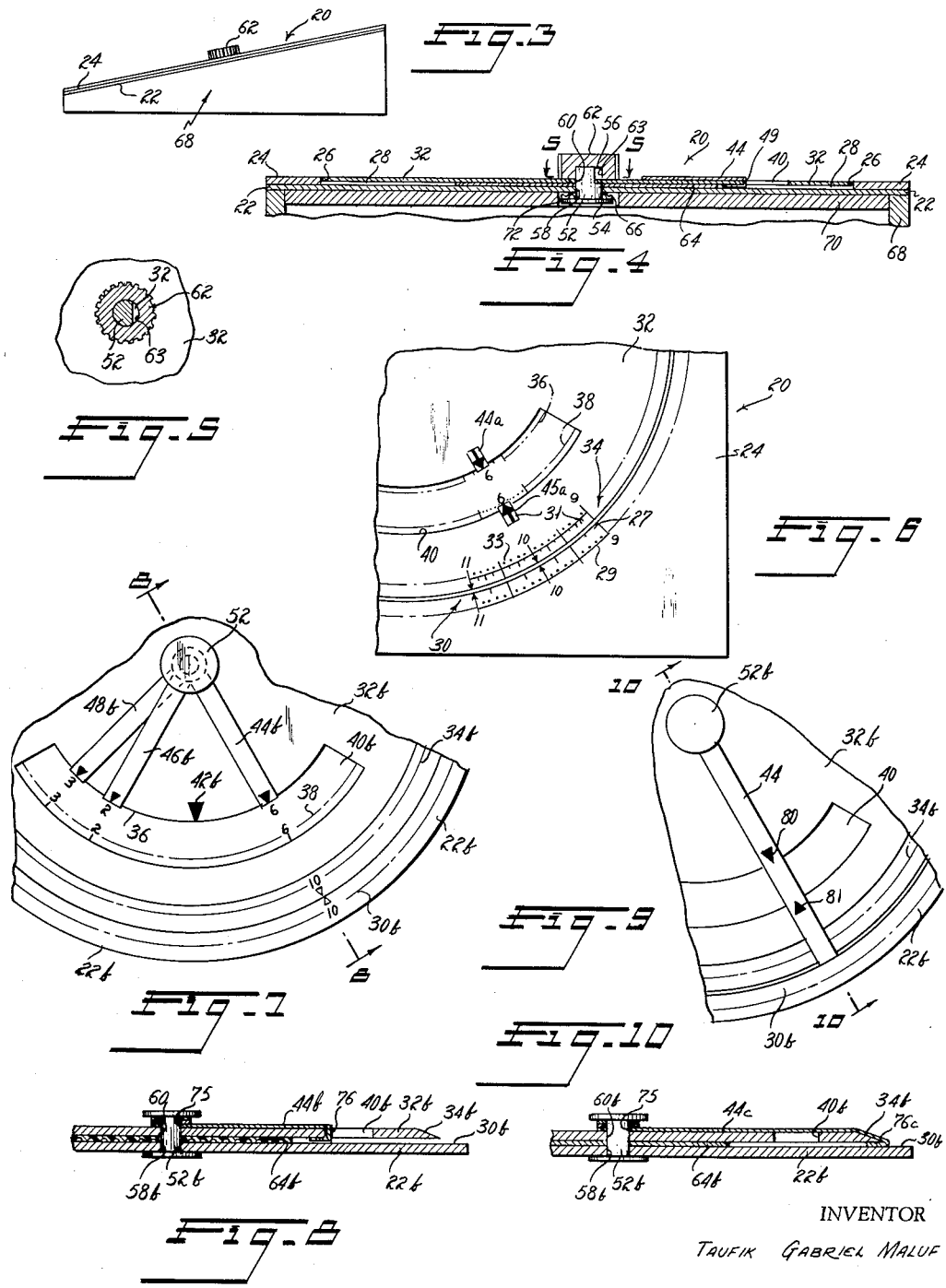

United States Patent Office 3,044,698
Patented July 17, 1962

3,044,698
ELAPSED TIME COMPUTER
Taufik Gabriel Maluf, 798 Juniper Drive, Logan, Utah
Filed Apr. 28, 1955, Ser. No. 504,619
19 Claims. (Cl. 235—83)

The present invention relates to the calculator art, and more particularly to a computer for calculating elapsed working time.

Many industries use a piece rate system for paying production employees doing unit operations on mass production items such as clothing, machinery, etc. Under this system, the rate per piece is calculated on the basis of the time required for the particular operation performed by an individual worker. From time to time, each unit operation is reviewed and retimed to adjust the piece rates for the different operations in accordance with the work involved to make the rates more equitable. To establish the time base for the piece rate with some degree of accuracy, each unit operation is timed. In some industries, this is done by clocking a number of individual operations (say 5) with a stop watch and using the average time as a base for the rate on that operation. However, in many industries this stop watch method is inherently unsuitable because it does not give an accurate dependable time base. For example, in the dress manufacturing industry, the variations in individual times for a given unit operation are almost endless, depending on such factors as operator fatigue, familiarity and experience with the operation, and the like. When this is the case, it is a preferable practice to time a group of component operations over a period of time to obtain the time base for the piece rate. Thus, in the dress industry a given operator may be timed on a sample lot of 100 dozen dresses, and the timing period will extend over several hours, or sometimes days. The time the operator starts and finishes the test lot is recorded and the rate per piece or dozen is calculated on the basis of the intervening elapsed time. In doing this, it is of course, necessary to allow for lunch, rest periods and any other breaks in the working shift to determine the net elapsed working time. Also, when a time run on a test lot carries over to a subsequent day or days, it is necessary to add the work time for each day.

One prevailing way of making the aforementioned time calculations is to figure the elapsed time mentally with the aid of a pencil, and sometimes a clock face. This requires a relatively experienced and higher paid employee, is time consuming, and is therefore quite costly. Moreover, this method provides considerable possibilities of human error. Hence, mental calculation of elapsed time has a number of shortcomings.

Another related elapsed time problem common in industry is the determination of how much labor cost is involved in a given unit or job lot of work, for cost study computations. For example, in the heavy machine industry, the manufacture of a given unit may take several days, or even weeks. There may be one or many workers applying their labor to the job and some may be pulled off the project and others added to it. If such a job takes more than one day, and if workers move on the job one day and off the subsequent day, it can be a substantial and time-consuming project to calculate all the net working hours put into the job, even with such equipment as adding machines.

The advantages of a simple and inexpensive computer for doing the calculations in the above-discussed everyday industrial problems are manifest. Yet, while a number of work time calculators have been heretofore developed, none of them are designed to effectively meet the above-discussed problems. The prior types of calculators are designed and intended to be used by a timekeeper or bookkeeper to compute the working time within a particular day principally for pay calculations and like purposes. They are not intended or designed for solution of cost-study or piece rate projects and their underlying principles and design of such prior calculators renders them unsuitable for effective application to the same problems.

The present invention, however, contemplates a novel time calculator incorporating new concepts and structural features which provide an effective means for quickly and unerringly computing elapsed time in the foregoing industrial problems by a single operation. Moreover, this new computer invention renders such computations routine so that they may be carried out by a relatively inexperienced operator with a minimum of training.

If an elapsed time computer is to meet the above-discussed problems effectively, it must not only provide for deduction of lunch and rest periods (as do some computers heretofore developed to make time-clock payroll computations for a given day), but it must also provide for (a) direct computation of elapsed time where the time period involved begins on one day and ends on the subsequent day, and (b) a.m. to a.m., and p.m. to p.m. calculations without requiring mental adjustments for the lunch and rest periods deducted by the computer. The computer of the present invention is adapted to perform these functions.

Furthermore, to be commercially practical for widespread industrial use on the aforementioned and related problems, an elapsed time computer must be readily adaptable to compensate for the differences in shift schedules prevailing throughout our economy. The "Net shift schedule" (that is, actual working time per shift, sometimes herein referred to as "net work shift" or "net work shift schedule") and the "Total shift schedule" (that is, total time at the job, including lunch and rest periods, etc. herein sometimes referred to as "total work shift" or "total work shift schedule") varies from industry to industry. A time computer, however, must be designed with scales based on a particular shift period. Therefore, if the computer is to be universally useful in all industries, it must include means for adjusting readings for the difference between the scale designed into the calculator and the Net and Total shift hour schedules in the particular industry where the computer is being used. The present invention contemplates a novel computer incorporating such means, whereby the computer is universally adaptable to all variations in shift schedules and time out, so that it can be used in all industries.

In addition to solving the aforementioned industrial problems which the art has heretofore failed to meet, in spite of their long and wide-spread existence, the present computer invention is also superior for simple timeclock calculations in payroll work. In payroll work, it is generally easier to work with tenths of an hour rather than in hours and minutes, and quick conversion from one to the other is frequently required. The present invention incorporates a simplified elapsed time scale making it possible to read the elapsed time results directly and simultaneously in hours and minutes and/or hours and tenths, and to convert immediately from one to the other. While there is a prior type of time-clock calculator known to applicant in which provision is made for obtaining answers in tenths of an hour or in minutes, the operator of such device must pre-set it to one scale or the other; and the two scales are not available for simultaneous reading in minutes and tenths or for immediate conversion from one to the other.

It is therefore a primary purpose of the present invention to provide a novel elapsed time computer which is adaptable to almost any elapsed time calculation problem, and effectively solves the above-discussed problems in work time calculations, making possible quick, easy elapsed time calculations for computing piece rates and total labor consumed.

It is a principal object of the present invention to provide an elapsed time computer which provides for direct calculation of time elapsed when the time period begins on one day and ends on a subsequent day.

It is another principal object of the present invention to provide an elapsed time computer which is readily adjustable to compensate for differences in Total and/or Net shift schedules, whereby this computer is universally adaptable to differing shift schedules prevailing throughout the country.

It is a further object of the present invention to provide a computer that provides for variable deduction of lunch and other time out periods, yet is adapted to direct calculation of elapsed time in all instances without change in the presetting of the computer or mental adjustment, whether the time period runs from a.m. to p.m., a.m. to a.m., p.m. to p.m., or p.m. to a.m.

It is a related object of the present invention to provide in a computer simplified readily adjustable auxiliary indicator means to achieve the foregoing objectives.

It is still another object of the present invention to provide a computer which can be quickly and easily preset to compensate for variations in time out, total shift schedule, and net shift schedule, to correspond to the prevailing conditions in a given industry and thereafter requires only one operation for each lapsed time computation.

It is a further object of the present invention to provide a time computer in which the elapsed time answer is alternatively and simultaneously readable in hours-and-minutes or in hours-and-tenths-of-an-hour, and in which results can be immediately converted from one unit to the other without any adjustment or changes in the computer setting.

It is still another object of the present invention to provide a computer having scales numbered over twenty-four hours for continuous round-the-clock calculations; and also numbered entirely around the periphery of the computer dials to provide a scale of maximum size for maximum accuracy in results.

It is another object of the present invention to provide a computer in which there is always a direct and obvious scale reading, so that a relatively inexperienced operator can use it with a minimum of confusion as to proper readings, and without mental adjustments.

It is a further object of the present invention to provide a computer that is much simpler to master by a relatively inexperienced employee with minimum training, than time computers heretofore available, yet performs more functions.

It is another object of the present invention to provide a computer which can be easily operated with one hand so that the operator's other hand is free for recording purposes. It is a related object of the present invention to provide a computer having a convenient turning knob for easy operation of the moving computer dial with one hand.

It is still another object of the present invention to provide a computer that achieves the foregoing objectives and advantages, yet is of remarkably simplified construction in view of its versatility, with a minimum of close tolerance parts, so that the computer is of economical and commercially feasible construction.

Further objects and advantages of the present invention will be apparent from the following description, reference being had therein to the accompanying drawings wherein preferred embodiments of the invention are shown. In the drawings:

FIGURE 3 is a side elevational view of the computer in FIGURE 1, shown on an inclined support provided for more convenient use;

FIGURE 4 is a sectional view taken along line 4—4 in FIGURE 1;

FIGURE 5 is a fragmentary sectional view taken along line 5—5 in FIGURE 4;

FIGURE 6 is a fragmentary plan view of part of the computer shown in FIGURES 1–5, but with a modified form of indicator means provided thereon;

FIGURE 7 is a fragmentary plan view similar to FIGURE 1 of a modified form of computer made according to the present invention;

FIGURE 8 is a cross-sectional view taken along the line 8—8 in FIGURE 7;

FIGURE 9 is a fragmentary plan view of another modification of the computer embodiment shown in FIGURES 7–8, with a modified indicator means; and FIGURE 10 is a cross-sectional view taken along the line 10—10 in FIGURE 9.

The elapsed time computer of this invention comprises a circular twenty-four hour scale rotating relative to another circular twenty-four hour scale which remains fixed. The difference in time between any given starting hour and time of finishing is expressed as a circular displacement of the two scales which is measured on an inner fixed dial and read as an elapsed time by means of an indicator on the moving scale. Adjustable auxiliary indicators are provided on the moving scale for net time readings when scheduled interruptions are involved, such as lunch hours and rest periods, or where the net or total work shifts differ from the common eight hour shift which is designed into the computer as the base scale for the elapsed time dial.

Figure 1:
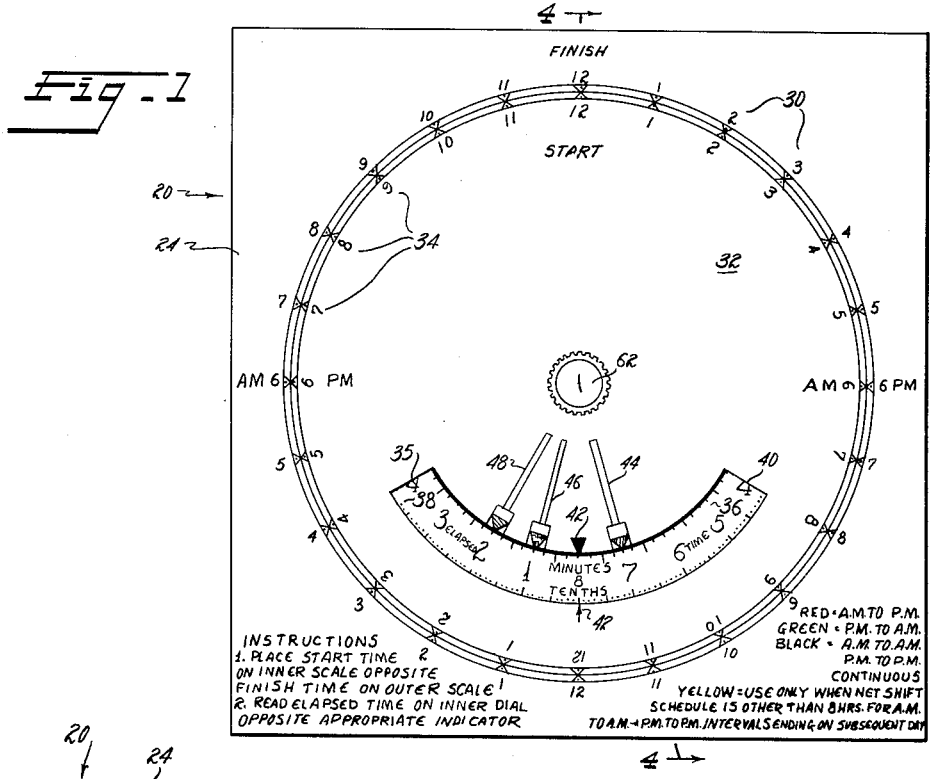
FIGURE 1 is a top plan view of a preferred embodiment of computer constructed in accordance with the present invention.
Figure 2:
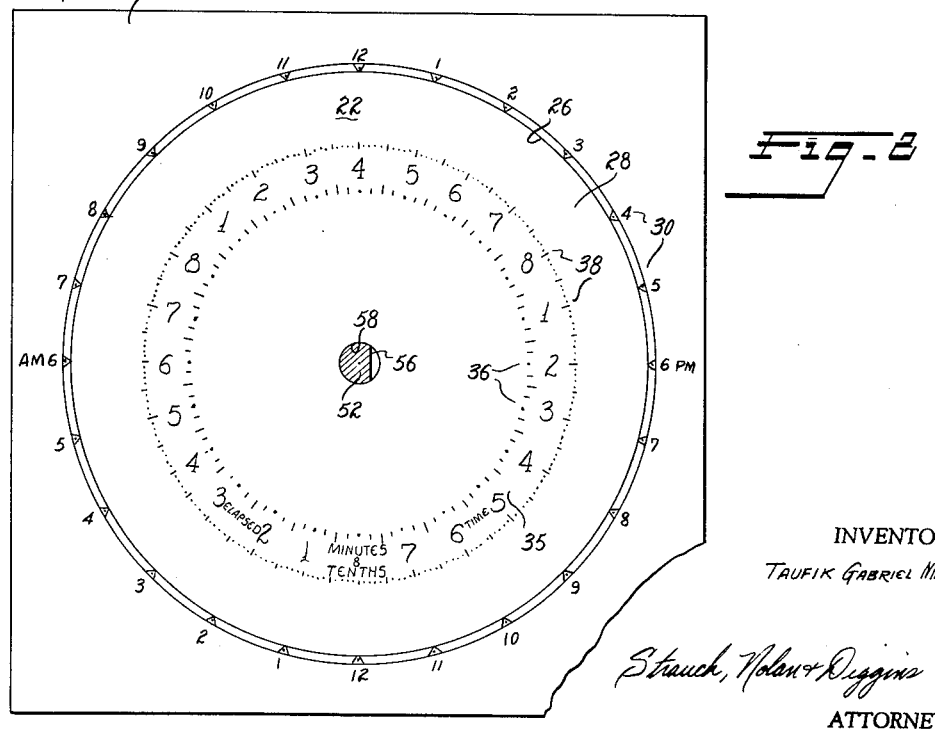
FIGURE 2 is a plan view of the computer shown in FIGURE 1, but with the inner computer dial removed.

Referring to the drawings, and more particularly to the embodiments of FIGURES 1–5, the numeral 20 indicates generally a computer constructed according to the present invention. The computer 20 comprises a stationary plate 22 of rectangular outline, on which is disposed a second plate 24 having a central hole defined by edge 26. Plates 22 and 24 are secured together in any suitable manner as by adhesive, rivets, a peripheral retaining frame, or like means, to provide a central circular disc-receiving recess 28. Of course, the resulting structure formed by plates 22 and 24 may be formed in one piece by molding or machining. The upper surface of plate 24 is provided with a twenty-four hour scale indicated at 30 which includes a series of graduations and numerals around the entire periphery of the circular recess 28, as shown in FIGURES 1 and 2. Starting at the top and reading clockwise, the numerals on scale 30 run consecutively from 12M through the p.m. hours to 12M; then from 12M at the bottom of the scale through the a.m. hours to 12M. The notations p.m. and a.m. are contained on opposite sides of scale 30 for convenient reference and the word "Finish" is also contained on the plate 24 at the top thereof as a convenient indication that scale 30 represents finish times.

A circular disc 32 is rotatably mounted on stationary plate 22 within the recess 28, and the outer edge of disc 32 is adjacent edge 26 of plate 24 as shown in FIGURES 1 and 4, with a slight clearance to permit unobstructed rotation of the disc.

The disc 32 is provided on its upper side with a scale 34 similar to scale 30 and including a like series of graduations and numerals extending around the entire periphery of the disc 32 adjacent its edge. Starting at the top of the disc 32 and reading clockwise, the numerals of the scale 34 run consecutively from 12M through the p.m. hours to 12M; and then from 12M through the a.m. hours to 12M. The word "Start" is imprinted on the face of disc 32 in suitable manner as a convenient indication that the scale 34 represents starting times.

Referring particularly to FIGURE 2, the lower plate 22 is provided with an elapsed time dial or register 35 including two concentric elapsed time scales 36 and 38. Each of scales 36 and 38 is divided into three sections of eight hours, which is the normal net work shift schedule in most industries. Thus, starting at the bottom in FIGURE 2 and reading clockwise, each scale 36 and 38 is provided with a series of graduations and numerals running from 8, 1–8, 1–8, 1–8. Each hour segment of the scale 36 is sub-divided into minutes. In the drawings, fifteen minutes sub-divisions are indicated, but it is feasible with a computer of practical size to break the hourly segments of scale 36 down to at least five minute intervals. Each hour segment of the scale 38 is sub-divided into tenths of an hour, making possible simultaneous and alternative reading of computed results in minutes or tenths of an hour, and immediate conversion from one to the other.

Referring particularly to FIGURES 1 and 4, an arcuate cut-out or window 40 is provided in the disc 32 to expose part of the elapsed time scales 36 and 38 so that computed results may be read therefrom as hereafter described. Disc 32 is provided along the edge of opening 40 with a fixed indicator 42 extending along the diameter running from numerals 12 to 12, and preferably imprinted directly on the disc 32. For convenience, the indicator 42 will be referred to as the "Black indicator." Disc 32 is also provided along the edge of opening 40 with a plurality of auxiliary indicators 44, 46 and 48. In the embodiment of FIGURES 1–5, each of the auxiliary indicators in a small resilient metal clip having a U-shaped end 49 adapted to be slipped over the edge of the window 40 as shown particularly in FIGURE 4, with sufficient tension and resiliency so that the auxiliary indicator will stay fixed in place, but is easy to slide to a new position when a change is necessary. The auxiliary indicators 44, 46 and 48 are shaped generally like arrows and have at their ends arrow heads of different colors for easy identification. They are also made narrow enough to permit close adjacent settings and are relatively long so that they may bear identifying marks in addition to the distinguishing colors or the arrowheads. In the illustrated embodiment, the arrowhead 44 bears a red marking, the arrowhead 46 bears a yellow marking and the arrowhead 48 bears a green marking, and each will be referred to as the "Red," "Yellow" and "Green" auxiliary indicator, respectively.

The purpose and use of the various indicators 42, 44, 46 and 48 is hereinafter explained fully under the discussion of "Principle of Operation."

Disc 32 is mounted in a suitable manner for rotation with respect to plate 24. In the embodiment of FIGURES 1–5, a pivot pin 52, having a retaining head 54 and a milled end 56, extends through a central circular opening 58 in the bottom plate 22. The milled end 56 is received in an opening 60 in the disc 32 which has a non-circular outline corresponding to that of milled section 56, as will be apparent from FIGURES 4 and 5. A knob 62 having a central bore 63 is non-rotatably secured to the upper end of pivot pin 52 in any suitable manner, as by a press fit, and its periphery is knurled so that it may be easily turned by the operator with thumb and forefinger if desired. It will be apparent from the foregoing description and the drawings that when the operator turns the knob 62 with this arrangement, pin 52 and disc 32 will be rotated together with respect to the plate 24 to oppose the start time of scale 34 against the finish time of scale 30. A thin annular washer 64 made of felt-like or similar material is interposed between the disc 32 and plate 22 to prevent marring of the surfaces. An annular spring or like means 66 is interposed between the head 54 of pivot pin 52 and the underside of plate 22 to urge knob 62 downward and impose a slight pressure on disc 32 to slightly restrict its rotational movement so that disc 32 will stay in place at any particular setting. Preferably, the computer 20 is supported on a base generally indicated at 68 comprising a top 70 slightly inclined for easy setting and reading of the scales 30, 34, 36 and 38, with a suitable central opening 72 to receive the base of pin 52. It will be appreciated, however, that the computer 20 could be constructed so that the lower-most portion of the pin does not extend outwardly of the underside of plate 22.

Full instructions for use of the computer are preferably imprinted on the face of plate 24 as shown in FIGURE 1.

*Principle of Operation*

To determine elapsed time with the above-described computer 20, disc 32 is rotated to counterpose the starting time on inner scale 34 opposite the finish time on outer scale 30. The elapsed time is read through cut-out or window 40 on the elapsed time scales 36 or 38 opposite one of indicators 42, 44, 46 or 48 on the inner disc 32. The particular indicator to be used in any given elapsed problem will vary depending on various factors as shown below.

In an elapsed time computer of this type, a particular base scale must necessarily be designed and calibrated into the elapsed time dial 35. In the embodiment disclosed, the elapsed time scales 36 and 38 of dial 35 are divided into three segments of eight hours each, which is the normal work period in most industries. (The elapsed time scale 36 and/or 38 of elapsed time dial or register 35 is herein sometimes referred to as the "elapsed time base scale," or "base time scale" of the elapsed time register.) An indicator means such as black indicator 42 is permanently imprinted on the inner disc 32 on one or both edges of window 40 to give direct elapsed time reading for continuous uninterrupted periods of time, like a.m. to a.m. or p.m. to p.m. For example, if the time period runs from 8 a.m. to 11:45 a.m., the 8 a.m. calibration on the start scale 34 is placed opposite the 11:45 a.m. calibration on the finish scale 30 and the black indicator 42 will then be opposite the 3:45 and 3.75 calibrations on the elapsed time scales 36 and 38, respectively, thereby indicating an elapsed time of three hours and forty-five minutes or 3.75 hours. If the continuous time period extends beyond eight hours it can readily be calculated by adding eight or sixteen hours to the reading appearing opposite the black indicator 42 on the elapsed time dial 35. For example, if the starting time is 9 a.m. and the work period runs continuously without lunch or other break to 7 p.m. then the 9 a.m. calibration on the start scale 34 is placed opposite the 7 p.m. calibration on finish scale 30, and the indicator 34 will indicate an elapsed time of two hours on the scales 36 and 38 of elapsed time dial 35. Eight hours is then added to the indicated reading and the total elapsed time result obtained from the computer is ten hours.

Almost all work shifts, however, are interrupted by scheduled work breaks like the lunch hour. Accordingly, if the work period starting time is prior to the lunch hour (or a like break), and the finish time is after it, means must be provided to adjust the elapsed time reading on dial 35 to compensate for the interruption if the computer is to give a direct reading of true elapsed working time in such a case. To this end, red auxiliary indicator 44 is provided for this purpose. To utilize red auxiliary indicator 44, the rotating disc 32 is set in neutral position as shown in FIGURE 1, and the red indicator 44 is mounted over the black permanent indicator 42. Then the red indicator 44 is retarded by sliding it counterclockwise until the distance indicated on the elapsed time dial 35 between the points of the black and red indicators is equal to the scheduled lunch period. Thus, if the scheduled lunch period is one hour, the red indicator 44 should be set to register one hour less than the black indicator 42 registers on the scales 36 and 38 of elapsed time dial 35. Elapsed time readings for a.m. to p.m. work periods are now directly indicated on the elapsed time dial 35 opposite the red indicator 44 without any need for mental adjustment or calculations. For example, if the work period starts at 8:45 a.m. and ends at 3:30 p.m. with an hour off for lunch, then the 8:45 calibration on the inner start scale 34 is placed opposite the 3:30 calibration on the outer finish scale 36 and the red indicator 34 will be opposite the 5:45 and 5:75 calibrations on the scales 36 and 38, respectively, thereby indicating a total elapsed time of 5¾ hours. The red indicator 44 also gives direct readings for a.m. to p.m. periods ending in a subsequent day; the computer reading is merely added to the net shift hours for the intervening day or days to obtain the total elapsed time.

The elapsed time dial 35 of a computer 20 necessarily has a fixed base scale (or scales). In the disclosed embodiment, these scales 36 and 38 are calibrated in eight hour intervals. In all industries either the total shift schedule or the net shift schedule must vary from the base scale designed into the elapsed time dial due to the lunch period. In some industries, both net and total shift schedules vary from the base scale designed into the computer due to various factors, like differences in working hours. It is therefore impossible to make direct computation of elapsed times (1) for work periods running from one day to a subsequent day p.m. to a.m., or (2) for periods running from one day to a subsequent day (a) a.m. to a.m. or (b) p.m. to p.m., unless means are provided for adjusting elapsed time readings to compensate for the differences between the base scale designed into the elapsed time dial of the computer and the total an/or net shift schedules.

Further, the net and total shift schedules vary considerably from industry to industry. If a computer is to be commercially practical and adaptable for wide-spread use in all industrial organizations it must embody means for adapting the fixed base scale that must necessarily be designed into the computer (like the eight hour intervals of dial 35 in the disclosed embodiment) to adjust for differences in both the net and total shift schedules in any particular industry in order to accomplish the aforementioned subsequent day calculations. To accomplish these purposes, the present invention embodies novel auxiliary indicator means, and more particularly the yellow and green auxiliary indicators indicated in the drawings at 46 and 48 respectively.

The green indicator 48 is provided to compensate for differences between total shift schedule (that is, the total hours at work including lunch and rest periods, etc.) from the eight hour intervals calibrated into the elapsed time dial 35, in order to directly compute true elapsed time in those cases where the work period begins in the p.m. and ends in the a.m. of a later day. For this purpose, the green indicator 48 is mounted over the black imprinted indicator 42 and then is advanced or retarded to an amount equal to the difference between eight hours and the total shift schedule similarly to the above-described method for pre-setting red indicator 44. For example, if the total shift schedule (including lunch period and breaks) is ten hours, say from 7 a.m. to 5 p.m., then the green indicator 48 should be advanced clockwise two hours from the black indicator 42, as shown in FIGURE 1.

The yellow indicator 46 is provided to compensate for differences between the net shift schedule (that is, the actual working hours in any shift) and the eight hour intervals calibrated into the elapsed time dial 35, in order to directly compute true elapsed times in the case of work periods running (1) from a.m. to a.m. or (2) from p.m. to p.m. beginning one day and ending in a subsequent day. Thus, if the net shift schedule equals eight hours, no auxiliary indicator would be required, but if the net shift schedule is not 8 hours, the yellow indicator 46 is used. For this purpose, the yellow indicator 46 is mounted over the imprinted black indicator 42 and then is advanced or retarded by an amount equal to the difference between eight hours and the net shift schedule. For example, if the work shift runs from 7 a.m. to 5 p.m. with one hour for lunch this would be a net working schedule of nine hours, and the yellow indicator 46 would be advanced clockwise one hour from the black indicator 42, as shown in FIGURE 1.

Use of the appropriate auxiliary green and yellow indicators 46 and 48 makes it possible to get true elapsed time readings directly from the dial 35 when the work is started on one day and completed on a later day for all net and/or total shift schedules without any adjustments. If any full days have intervened the net shift work hours for such intervening days are simply added to the reading on the dial 35 opposite the auxiliary indicator. For example, let us assume an industry operating on a total shift schedule of ten hours, 7 a.m. to 5 p.m., with one hour off for lunch, and a net working schedule of nine hours, so that the settings of the auxiliary indicators 44, 46 and 48 will be as in FIGURE 1 of the drawings; and further assume that a particular job is started on Monday at 2 p.m. and completed on Tuesday at 10 a.m. In such case, the 2 p.m. calibration on the start scale 34 is placed opposite the 10 a.m. calibration on the finish scale 36 and the results are read opposite the green indicator 48 (according to the instructions on the face of plate 24 as shown in FIGURE 1), giving a direct reading of six hours true elapsed time. If, however, the work had been started on Monday at 2 p.m. and was not completed until Wednesday at 10 a.m., the computer would give a direct reading of 6 hours and it is then only necessary to add nine hours for the net working shift on the intervening day, Tuesday. Thus, the total elapsed time in this case would be six plus nine equals fifteen hours.

It should be noted that the green indicator is used for subsequent day calculations only when the work period begins on a p.m. hour and is completed in the morning. If the work begins in the a.m. and is completed in the a.m. of a subsequent day, or begins in the p.m. and is completed in the p.m. of a subsequent day, then the yellow indicator 46 is used, if the net shift schedule differs from the eight hour schedule calibrated into the computer dial 35. If, however, the net shift schedule is the same as the base interval built into the computer in scale 35 (eight hours in the disclosed embodiment), then yellow indicator 46 is left off and the elapsed time reading is obtained by black indicator 42.

At any given time, each company or industry has a particular standard net shift schedule and total shift schedule, and standardized lunch hours and rest periods. Hence, the adjustments of auxiliary red, yellow and green indicators 44, 46 and 48, respectively, need be made only once and remain unchanged, unless and until there is a change in the working hours of the company. Therefore, the necessary settings of the auxiliary indicators 44, 46 and 48 can be made by the manufacturer or seller of the computer according to the needs of the industry if desired, but the auxiliary indicators can be so easily and conveniently set that the settings can be made by the purchaser himself without any difficulty.

It will be apparent that my computer is so designed that the true elapsed time may be simultaneously and alternatively read in hours and minutes or in hours and tenths of an hour from scales 36 and 38 respectively, without any further change or adjustment in the computer or computer setting. It will also be apparent that the elapsed time dial 35 can be used to convert hour and minute settings directly into hours and tenths readings by use of scales 36 and 38 of the elapsed time dial 35. This function is useful when it is desired to use the computer 20 for time clock card calculations for payroll purposes in which it is generally easier and more convenient to work with tenths of an hour than with minutes.

Although the underlying principles of the computer of this invention are relatively complex, the use of the computer 20 is extremely simple. It can be used by a relatively low wage operator having relatively little training and experience to compute true elapsed times directly by one operation and setting, and without any mental adjustments or calculations. All the operator has to do is set start time against finish time and take the reading off the proper indicator according to the simple operating instructions provided with the computer. These instructions are preferably, but not necessarily, imprinted on the face thereof of the computer for permanent convenient reference as in the embodiments of FIGURES 1-5. An operator of normal intelligence will rapidly master the selection of appropriate indicator for a given problem, especially when identifying markings and notations are provided thereon as contemplated, so that resort to the imprinted instructions will actually be limited to initial calculations.

Referring to FIGURE 6, a modification is disclosed therein which is substantially the the same as the embodiment of FIGURES 1-5, and for convenience and clarity like parts are indicated with like numerals and the subscript a. This embodiment is like the above-described computer 20 of FIGURES 1-5 excepting that the auxiliary indicators comprise a pair of U-shaped clips 44a and 45a in opposed radial alignment and secured to the edges of cut-out 40 similarly to indicator 44 as shown in FIGURE 4, for easy accurate conversion of readings on the elapsed time dial from minutes to tenths of an hour.

Many industries keep track of elapsed job times with clocks that record starting and finishing times in tenths of an hour instead of hours and minutes. In order for the elapsed computer of this invention to be conveniently usable by such industries, the computer may be provided with start and finish time scales each comprising a dual scale calibrated to provide a choice of time settings in either minutes or tenths of an hour. A section of such a scale arrangement is shown in the fragmentary plan view of FIGURE 6 in which finish scale 30 is a dual scale comprising a scale 27 calibrated in minutes and a scale 29 calibrated in tenths of an hour; and start scale 34 is a dual scale comprising a scale 31 calibrated in minutes and a scale 33 calibrated in tenths of an hour. To avoid confusion between the differently calibrated scales, they are preferably printed in contrasting colors. Also an additional distinction is preferable, by using different types of calibrations; thus, in a typical embodiment minutes would be indicated by ruled lines, and tenths of an hour by dots, as in the embodiment of FIGURE 6. It will be apparent from the foregoing that such a computer would lend itself to use in industries using either hours-and-tenths time clocks, or hours-and-minutes time clocks, with the results being readable in either minutes or tenths from the elapsed time scales 36 and 38 respectively.

Referring particularly to FIGURES 7-8, the modification disclosed therein is similar to that of FIGURES 1-5, and for clarity like parts will be identified with like numerals and the subscript b insofar as possible.

This embodiment comprises a circular base plate 22b having the finish time scale 30b imprinted directly on its upper surface along its peripheral edge. A revolving start time disc 32b is provided with a start time scale 34b along its outer periphery, and the edge of the disc 32b is preferably beveled like a ruler edge to permit a more exact alignment of the scales 30b and 34b. Discs 22b and 32b are rotatably secured together by a double headed pin 52b extending through circular openings 58b and 60b in discs 22b and 32b respectively as is shown in FIGURE 8. A thin annular washer 64b is interposed between plates 22b and 32b, and this washer is preferably made of plastic, with perforations on one or both surfaces thereof so that it will have inherent resiliency and impose a slight tension tending to restrict relative rotation between the plate 22b and disc 32b so that computer settings are not inadvertently changed during computations. A cutout 40b is provided in the disc 32b to permit reading the elapsed time scales 36 and 38 in minutes and tenths of an hour, respectively. A fixed indicator 42b is imprinted on the disc 32b and a plurality of auxiliary indicators 44b, 46b and 48b are also provided for the same purposes as auxiliary indicators 44, 46 and 48 in the embodiment of FIGURES 1-5. In this embodiment, however, the indicators 44b, 46b and 48b comprise thin plastic radial strips, each provided at one end with circular openings 75 receiving pin 52b and at its other end with a U-shaped retaining section 76. Section 76 has sufficient resiliency and spring tension so that it will retain the indicator in place at a given setting yet permit it to be rotated about the pin 52 to a new position if a change in setting is required.

Referring to FIGURES 9-10, the modification disclosed therein is substantially the same as the above-described embodiment of FIGURES 7-8 excepting for the auxiliary indicators indicated at 44c, and like parts are therefore identified with the same numerals as in FIGURES 7-8. In this embodiment, each of the auxiliary indicators is provided at one end with a circular opening 75 receiving the pivot pin 52b, and the other end is provided with a generally U-shaped retaining section 76c which extends around the outer periphery of the disc 32b as shown in FIGURE 10 and grips said disc edge with sufficient tension so that it will stay in place but can be easily removed for setting in another position. Referring to FIGURE 9, a pair of colored arrowheads are imprinted on the transparent auxiliary indicator arm 44b (and also arms 46b and 48b not shown) in radial alignment as indicated at 80 and 81.

A circular type computer as disclosed above is preferable to a slide rule type, because the former has a continuous endless, larger scale, and can be operated with one hand, among other reasons. However, the novel auxiliary indicator concepts and principles of the invention disclosed herein can be applied to a slide rule type of elapsed time computer.

It will be apparent from the foregoing that the present invention provides a novel elapsed time computer that is adaptable to direct computation of elapsed times for work periods beginning on one day and ending on a subsequent day; that includes means which compensate for time out periods such as the lunch hour; that is adjustable to compensate for differences in the "total shift" and "net shift" work schedules whereby the computer in universally adapted to different shift schedules prevailing in various industries throughout the economy; that embodies simple, inexpensive, auxiliary indicator means to achieve the foregoing adaptability and versatility; that provides direct reading of elapsed times alternatively and simultaneously in hours and minutes or in hours and tenths of an hour, without any change in the computer setting or adjustment of computer components, enabling conversion from hours and minutes to hours and tenths for time clock and payroll work. It will further be apparent that the computer of this invention always provides a direct and obvious scale reading for the operator without mental adjustment thereby eliminating confusion or mistake as to the proper readings; that the computer calibrated with a twenty-four hour scale for continuous round the clock calculations, and the scales extend around the entire computer periphery to provide a scale of maximum size making possible more accurate readings; that the computer has a convenient turning means so that it can easily be operated by the thumb and forefinger of one hand leaving the other hand entirely free for pencil work or other purposes; that the computer can be pre-set to compensate for variations in total shift and net shift schedules and lunch hour and rest periods so that only one operation is required for each elapsed time computation; and that this computer is simpler to master with a minimum of training than computers heretofore available, yet accomplishes more functions and has more versatility.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A computer comprising: first and second members with first and second time scales of like units and like total time span calibrated on each of said members, respectively, and in juxaposed relationship to each other; said members being movable with respect to one another to effect a relative displacement of said first and second time scales; an elapsed time base scale calibrated on one of said members with predetermined sub-divisions of said total time span on said first and second time scales; indicator means on the other of said members for directly indicating elapsed time on said elapsed time base scale for continuous uninterrupted periods according to the relative displacement of said first and second time scales on said first and second members; first adjustable auxiliary indicator means on said other of said members to compensate for a time difference between the net work shift schedule and the elapsed time base scale calibrated on said other member; second adjustable auxiliary indicator means on the other of said members for compensating for a time difference between the total work shift and the elapsed time base scale calibrated on said one member; and third adjustable auxiliary indicator means to compensate for a scheduled interruption during the work period to give an elapsed time reading on the elapsed time base scale for a time period beginning prior to and ending after such interruption; each of said first, second and third adjustable indicator means cooperating with said elapsed time base scale.

2. A computer comprising: first and second members, with a first and second circular calibrated time scale having a twenty-four hour time span on each of said members in opposed relation, and one of said members being rotatable with respect to the other to effect a relative displacement between said time scales; an elapsed time register comprising a circular calibrated base time scale on one of said members with predetermined sub-divisions of said time span on said first and second time scales; indicator means on the other of said members for indicating elapsed time on said base time scale for a continuous uninterrupted period according to the relative displacement between said first and second circular time scales; first adjustable auxiliary indicator means on said other of said members to compensate for a time difference between the net work shift schedule and the base time scale calibrated into said elapsed time register; second adjustable auxiliary indicator means on said other of said members to compensate for a time difference between the total work shift and the base time scale calibrated into the elapsed time register; and third adjustable indicator means to compensate for a scheduled interruption during a given work period to give an adjusted reading on the elapsed time base scale for time periods beginning prior to and ending after such interruption, whereby said adjusted reading is indicative of actual elapsed time when the involve time period begins and ends on the same work day and said adjusted reading is directly usable in computing total elapsed time when the involved time period begins and ends on different days; said first, second and third adjustable indicator means cooperating with said base time scale of said time register.

3. A computer comprising: a first member having a circular time scale having a twenty-four hour time span thereon; a second disc-like member of substantially circular outline disposed on said first member, with a circular time scale having a twenty-four calibrated time span extending around its periphery in opposed relation to said first-mentioned time scale, one of said time scales being a start scale and the other being a finish scale; means for connecting said members to permit relative rotation therebetween to effect a relative displacement between said first and second mentioned time scales; a circular elapsed time dial on said first member comprising a base time scale calibrated on said first member with predetermined sub-divisions of said time span on said first and second time scales; an aperture provided in part of said second member overlying said elapsed time dial to permit reading of said base time scale; means on said second member adjacent said aperture for directly indicating elapsed time on said base time scale for continuous uninterrupted periods according to the relative displacement between said first and second mentioned time scales; and adjustable auxiliary indicator means on said disc-like member adjacent said aperture for compensating for a time difference between net work shift and the base time scale calibrated into said elapsed time dial to give a direct compensated elapsed time reading on said base time scale which is indicative of actual elapsed time when the time period involved begins and ends in like forenoon and afternoon periods, respectively, on successive working days and which is directly usable in computing total elapsed time when at least one working day intervenes between beginning and end of the involved time period, said means cooperating with said base time scale of said elapsed time dial.

4. A computer comprising: a first member having a circular time scale having a twenty-four hour time span thereon; a second disc-like member of substantially circular outline disposed on said first member, with a circular time scale having a twenty-four hour calibrated time span extending around its periphery in opposed relation to said first mentioned time scale, one of said time scales being a start and the other being a finish scale; means for connecting said members to permit relative rotation therebetween to effect a relative displacement between said first and second mentioned time scales; a circular elapsed time dial on said first member comprising a base time scale calibrated on said first member with predetermined sub-divisions of said time span on said first and second time scales; an aperture provided in part of said second member overlying said elapsed time dial to permit reading of said base time scale; means on said second member adjacent said aperture for directly indicating elapsed time on said base time scale for continuous uninterrupted periods according to the relative displacement between said first and second mentioned time scales; and an adjustable auxiliary indicator means on said disc-like member adjacent said aperture for compensating for a time difference between the total work shift schedule and the base time scale calibrated into said elapsed time dial to give a direct compensated elapsed time reading on said base time scale which is indicative of actual elapsed time when the involved time period is from p.m. to a.m. on successive working days and which is directly usable in computing total elapsed time when at least one working day intervenes between the beginning and end of the involved time period, said means cooperating with said base time scale of said elapsed time dial.

5. A computer comprising: a first member having a circular time scale of twenty-four hour time span thereon; a second disc-like member of substantially circular outline disposed on said first member, having a circular time scale of twenty-four hour calibrated time span extending around its periphery in opposed relation to said first mentioned time scale, one of said time scales being a start scale and the other being a finish scale; means for connecting said members to permit relative rotation therebetween to effect a relative displacement between said first and second mentioned time scales; a circular elapsed time dial on said first member comprising a base time scale calibrated on said first member with predetermined sub-divisions of said time span on said first and second time scales; an aperture provided in part of said second member overlying said elapsed time dial to permit reading of said base time scale; means on said second member adjacent said aperture for directly indicating elapsed time on said base time scale for continuous uninterrupted periods according to the relative displacement between said first and second mentioned time scales; and an adjustable auxiliary indicator means for compensating for a scheduled interruption during the work period to give a direct compensated elapsed time reading on said base time scale for periods beginning prior to and ending after such interruption, which compensated reading is indicative of actual elapsed time when the involved time period begins and ends on the same work day and is directly usable in computing total elapsed time when the time period involved begins and ends on different work days, said means cooperating with said base time scale of said elapsed time dial.

6. A computer comprising: a first member having a circular time scale of twenty-four hour time span thereon; a second disc-like member of substantially circular outline disposed on said first member, having a circular time scale of twenty-four hour calibrated time span extending around its periphery in opposed relation to said first mentioned time scale, one of said time scales being a start scale and the other being a finish scale; means for connecting said members to permit relative rotation therebetween to effect a relative displacement between said first and second mentioned time scales; a circular elapsed time dial on said first member comprising a base time scale calibrated on said member with pre-determined sub-divisions of said time span on said start and finish time scales; an aperture provided in part of said second member overlying said elapsed time dial to permit reading of said base time scale; means on said second member for directly indicating elapsed time on said dial for continuous uninterrupted periods according to the relative displacement between said first and second mentioned time scales; first adjustable auxiliary indicator means on said disc-like member adjacent said aperture to compensate for a time difference between the net work shift schedule and the base time scale calibrated into said elapsed time dial giving a direct compensated elapsed time reading on said dial, whereby said compensated reading is indicative of actual elapsed time when the involved time is from a.m. to a.m. or from p.m. to p.m., on successive working days and is directly usable in computing total elapsed time when at least one work day intervenes between the beginning and end of the involved time period; second adjustable auxiliary indicator means on said disc-like member adjacent said aperture to compensate for a time difference between the total work shift schedule and said base time scale calibrated into the elapsed time dial to give a direct compensated reading on said dial, whereby said compensated reading is indicative of actual elapsed time when the involved time period is from p.m. to a.m. on successive working days and is directly usable in computing total elapsed time when at least one day intervenes between the beginning and end of the involved time period; and third adjustable auxiliary indicator means to compensate for a scheduled interruption during the work period to give a direct compensated reading on the elapsed time dial for time periods beginning prior to and ending after such interruption, whereby said compensated reading is indicative of actual elapsed time when the involved time period begins and ends on the same work day and is directly usable in computing total elapsed time when the involved time periods begins and ends on different days.

7. A computer comprising: first and second members with a first and second time scale of like units and like total time span calibrated on each of said members, respectively, and in opposed relationship to each other; said members being movable with respect to one another to effect a relative displacement of said time scales; an elapsed time base scale calibrated on one of said members with predetermined sub-divisions of said total time span on said first and second time scales; means for indicating elapsed time on said elapsed time base scale for continuous uninterrupted periods according to the relative displacement between said first and second time scales on said first and second members; and means for compensating for a time difference between net work shift and said elapsed time base scale calibrated on said one member, said means cooperating with said elapsed time base scale.

8. A computer as defined in claim 7 further comprising: means for compensating for a scheduled interruption during the work period to give an adjusted elapsed time reading on said elapsed time base scale for time periods beginning prior to and ending after such interruption, whereby said adjusted reading is indicative of actual elapsed time when the time period involved begins and ends on the same work day and said adjusted reading is directly usable in computing total elapsed time when the time period involved begins and ends on different days, said means cooperating with said elapsed time base scale.

9. A computer as defined in claim 7, wherein said elapsed time base scale comprises juxtaposed corresponding scales respectively calibrated in hours-and-minutes and hours-and tenths for direct simultaneous alternative readings according to said respective calibrations.

10. A computer as defined in claim 9, wherein each of said first and second time scales calibrated on each of said first and second members comprises a pair of juxtaposed corresponding scales respectively calibrated in hours-and-tenths and hours-and-minutes.

11. A computer comprising: first and second members with a first and second time scale of like units and like total time span calibrated on each of said members, respectively, and in opposed relationship to each other; said members being movable with respect to one another to effect a relative displacement of said first and second time scales; an elapsed time base scale calibrated on one of said members with predetermined sub-divisions of the total time span on said first and second time scales; means for indicating elapsed time on said elapsed time base scale for continuous uninterrupted periods according to the relative displacement between said first and second time scales on said first and second members; and means for compensating for a time difference between the total work shift and said elapsed time base scale calibrated on said one member, said means cooperating with said elapsed time base scale.

12. A computer as defined in claim 11, further comprising: means for compensating for a scheduled interruption during the work period to give an adjusted elapsed time reading on said elapsed base scale for time periods beginning prior to and ending after such interruption, said means cooperating with said elapsed time base scale.

13. A computer as defined in claim 11, wherein said elapsed time base scale comprises dually calibrated scale sub-dividing respectively hour spaces into minutes and tenth-of-an-hour segments juxtaposed for direct simultaneous alternative readings in either system according to the respective juxtaposed graduations on said dual scale.

14. A computer as defined in claim 13, wherein each of said first and second time scales calibrated on each of said first and second members comprises a pair of juxtaposed corresponding scales respectively calibrated in hours-and-tenths and hours-and-minutes.

15. A computer comprising: first and second members, with a first and second circular time scale having a twenty-four hour time span calibrated on each of said members, respectively, in juxtaposed relation; one of said members being rotatable with respect to the other to effect a relative displacement between said first and second time scales; an elapsed time register comprising a circular base time scale calibrated on one of said members with pre-determined sub-divisions of said time span on said first and second time scales; indicator means on the other of said members for indicating on said register elapsed time for continuous uninterrupted periods according to the relative displacement between said first and second circular time scales; and an adjustable auxiliary indicator means on one of said members to compensate for a time difference between the net work shift schedule and said base time scale calibrated on said one member, said means cooperating with the base time scale of said elapsed time register.

16. A computer comprising: first and second members, with a first and second calibrated time scale having a twenty-four hour time span calibrated on each of said members, respectively, in juxtaposed relation; one of said members being rotatable with respect to the other to effect a relative displacement between said first and second time scales; an elapsed time register comprising a circular base time scale calibrated on one of said members with predetermined sub-divisions of said time span on said first and second time scales; indicator means on the other of said members for indicating on said register elapsed time for continuous uninterrupted periods according to the relative displacement between said first and second circular time scales; an adjustable auxiliary indicator means on one of said members to compensate for a time difference between the total work shift schedule and said base time scale calibrated on said one member, said means cooperating with the base time scale of said elapsed time register.

17. A computer comprising: first and second members, with a first and second circular time scale having a twenty-four hour time span calibrated on each of said members, respectively, in juxtaposed relation; one of said members being rotatable with respect to the other to effect a relative displacement between said first and second time scales; an elapsed time register comprising a circular base time scale calibrated on one of said members with predetermined sub-divisions of said time span on said first and second time scales; indicator means on the other of said members for indicating on said register elapsed time for continuous uninterrupted periods according to the relative displacement between said first and second circular time scales; and an adjustable auxiliary indicator means for compensating for a scheduled interruption during the work day to give an adjusted elapsed time reading on said base time scale for a period beginning prior to and ending after such interruption, which adjusted reading is indicative of the actual elapsed time when the involved time period begins and ends on the same work day and is directly usable in computing total elapsed time when the time period involved begins and ends on different days, said means cooperating with the base time scale of said elapsed time register.

18. A computer as defined in claim 17, wherein said elapsed time register comprises dual juxtaposed base time scales respectively calibrated in hours-and-minutes and hours-and-tenths for direct simultaneous readings accordingly to said respective calibrations.

19. A computer as defined in claim 18, wherein each of said first and second calibrated time scales comprises a pair of dual juxtaposed corresponding scales respectively calibrated in hours-and-minutes and hours-and-tenths.

References Cited in the file of this patent

UNITED STATES PATENTS

| | | |
|---|---|---|
| 1,397,944 | Dazell | Nov. 22, 1921 |
| 1,444,619 | Lucas | Feb. 6, 1923 |
| 1,471,341 | Lamb | Oct. 23, 1923 |
| 1,563,284 | Laurin | Nov. 24, 1925 |
| 2,201,941 | Behr | May 21, 1940 |
| 2,437,621 | Strate | Mar. 9, 1948 |
| 2,442,657 | Linowitz | June 1, 1948 |
| 2,532,619 | Heerich | Dec. 5, 1950 |
| 2,585,642 | Fattor | Feb. 12, 1952 |

FOREIGN PATENTS

| | | |
|---|---|---|
| 23,122 | Switzerland | Dec. 3, 1900 |

OTHER REFERENCES

"Special Slide Rules," by J. N. Arnold, which comprises Extension Series Bulletin No. 32, published by Purdue University of Lafayette, Ind., and dated September 1933, page 25.

"Practical Air Navigation," by T. C. Lyon, comprising "Civil Aeronautics Bulletin No. 24," dated September 1940, FIG. 95 on page 146, and FIG. 92 on page 141, and paragraph 1 on page 142.